United States Patent
Yamagi

(10) Patent No.: US 9,781,391 B2
(45) Date of Patent: Oct. 3, 2017

(54) MONITORING CAMERA DEVICE, MONITORING SYSTEM HAVING MONITORING CAMERA DEVICE, MASK PROCESSING METHOD, AND NON-TRANSITORY COMPUTER-READABLE RECORDING MEDIUM WHICH STORES MASK PROCESSING PROGRAM

(71) Applicant: PANASONIC CORPORATION, Osaka (JP)

(72) Inventor: Yoichiro Yamagi, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 265 days.

(21) Appl. No.: 14/090,399

(22) Filed: Nov. 26, 2013

(65) Prior Publication Data
US 2014/0160282 A1    Jun. 12, 2014

(30) Foreign Application Priority Data
Nov. 29, 2012    (JP) .................................. 2012-260799

(51) Int. Cl.
*H04N 7/18*    (2006.01)

(52) U.S. Cl.
CPC ..................................... *H04N 7/18* (2013.01)

(58) Field of Classification Search
CPC ....................................................... H04N 7/18
USPC ........................................................ 348/143
See application file for complete search history.

(56) References Cited

U.S. PATENT DOCUMENTS

| | | | |
|---|---|---|---|
| 6,744,461 B1* | 6/2004 | Wada | H04N 7/18 348/143 |
| 2005/0068437 A1* | 3/2005 | Hayasaka | G08B 13/19682 348/294 |
| 2008/0036877 A1 | 2/2008 | Arima | |

(Continued)

FOREIGN PATENT DOCUMENTS

| | | |
|---|---|---|
| EP | 1081955 | 3/2001 |
| GB | 2440824 | 2/2008 |
| JP | 2001-69494 | 3/2001 |

(Continued)

OTHER PUBLICATIONS

"JP 2011-193115 Translation". Sep. 2011.*
(Continued)

*Primary Examiner* — Zhihan Zhou
(74) *Attorney, Agent, or Firm* — Greenblum & Bernstein, P.L.C.

(57) ABSTRACT

The monitoring camera device has: an image capturing unit which captures an image of an object and generates a video image; a mask region storage unit which stores a mask region; a mask execution region setting unit which, when a predetermined number or more mask regions are included in an image capturing range, joins a plurality of mask regions to be selected based on a closeness evaluation value which represents closeness of the mask regions and generates an enlarged mask region, and sets as a mask execution region the plurality of mask regions which includes the enlarged mask region in the image capturing range; and a mask processing unit which performs mask processing on the mask execution region of the video image.

15 Claims, 5 Drawing Sheets

F2

(56) References Cited

U.S. PATENT DOCUMENTS

2011/0304611 A1* 12/2011 Suzuki .................. G06T 19/006
                                                        345/419
2013/0182925 A1*  7/2013 Razeto .................... A61B 6/03
                                                        382/131

FOREIGN PATENT DOCUMENTS

JP      2004-304847     10/2004
JP      2011-193115      9/2011

OTHER PUBLICATIONS

Search Report issued in European Patent Office (EPO) Patent Application No. 13194297.1, dated Oct. 11, 2016.
Office Action issued in Japan Counterpart Patent Appl. No. 2012-260799, dated Sep. 6, 2016.

* cited by examiner

MONITORING CAMERA DEVICE, MONITORING SYSTEM HAVING MONITORING CAMERA DEVICE, MASK PROCESSING METHOD, AND NON-TRANSITORY COMPUTER-READABLE RECORDING MEDIUM WHICH STORES MASK PROCESSING PROGRAM

BACKGROUND

Technical Field

The present invention relates to a monitoring camera device, a monitoring system, which has the monitoring camera device, a mask processing method and a mask processing program which mask part of a video image to protect privacy.

Related Art

Conventionally, monitoring cameras which capture images of monitoring objects and perform mask processing on regions related to privacy in monitoring video images are known. Further, among these monitoring cameras, there is a monitoring camera which captures an image of a monitoring object while changing an image capturing range. By driving the monitoring camera in a tilt direction and a pan direction by a camera rotating table, the image capturing range can be moved in upper and lower directions and left and right directions and the image capturing range can be enlarged and reduced by a zoom function of an optical system of the monitoring camera.

Mask processing is performed on a monitoring video image using a function of hardware of the monitoring camera. In this case, due to limitation of hardware resources, the number of regions which can be set as mask regions to a monitoring video image is limited. Therefore, when the number of regions which need to be subjected to mask processing in the monitoring video image exceeds a predetermined number, it is not possible to perform mask processing on part of the regions.

Further, when an image capturing range of the monitoring camera which captures an image of a monitoring object while changing the image capturing range by panning, tilting and zooming operations (PTZ operation) changes, the number of regions which need to be subjected to mask processing included in a monitoring video image also changes, and the number of the regions included in the monitoring video images may exceed the predetermined number or go below the predetermined number.

JP 2001-69494 A discloses a technique which sets mask regions of a monitoring camera through a personal computer, and the personal computer cannot keep up with processing when the number of regions which need to be subjected to mask processing is too high and, therefore, has a function of counting the number of regions which need to be subjected to mask processing and not permitting the setting of the mask processing when the number of regions which need to be subjected to mask processing exceeds the predetermined number. Further, it is also disclosed that a plurality of privacy zones is covered by one mask so as to reduce the number of regions which need to be subjected to the mask processing. Furthermore, it is also disclosed that, when a plurality of mask regions is included in one screen, transformation is performed to obtain one enlarged mask region including these mask regions and mask processing is performed.

SUMMARY

However, while JP 2001-69494 A discloses covering a plurality of privacy zones and transforming a plurality of masks into one enlarged mask including these masks, that is, reducing the number of mask regions by joining a plurality of mask regions, conditions of mask regions to be joined are unclear, and therefore which mask regions are joined is not clear.

Further, JP 2001-69494 A is directed to reducing a processing load and a processing time upon mask processing, and therefore when a plurality of mask regions is included in one screen, for example, a plurality of mask regions is transformed into one enlarged mask region including these mask regions, the mask region is made bigger more than necessary and a utility value of a monitoring video image is substantially impaired.

Furthermore, while, as described above, an image capturing range of a monitoring camera which can perform a PTZ operation is changed by the PTZ operation, JP 2001-69494 A does not take into account a change of such an image capturing range to join a plurality of mask regions.

The present technology is made in light of the above problem, and an object of the present technology is to provide a new monitoring camera device which, when there is a plurality of mask regions in a monitoring video camera, reduces the number of mask regions by joining part of mask regions.

A monitoring camera device employs a configuration including: an image capturing unit which captures an image of an object and generates a video image; a mask region storage unit which stores a mask region; a mask execution region setting unit which, when a predetermined number or more mask regions are included in an image capturing range, joins a plurality of mask regions to be selected based on a closeness evaluation value which represents closeness of the mask regions and generates an enlarged mask region, and sets as a mask execution region the plurality of mask regions which includes the enlarged mask region in the image capturing range; and a mask processing unit which performs mask processing on the mask execution region of the video image.

A monitoring system employs a configuration including: an image capturing unit which captures an image of an object and generates a video image; a mask region storage unit which stores a mask region; a mask execution region setting unit which, when a predetermined number or more mask regions are included in an image capturing range of the image capturing unit, joins a plurality of mask regions to be selected based on a closeness evaluation value which represents closeness of the mask regions and generates an enlarged mask region, and sets as a mask execution region the plurality of mask regions which includes the enlarged mask region in the image capturing range; a mask processing unit which performs mask processing on the mask execution region of the video image; and a display monitor which displays the video image subjected to the mask processing.

A mask processing method includes: an image capturing step of capturing an image of an object and generating a video image; a mask region counting step of counting how many mask regions stored in advance are included in an image capturing range; a mask execution region setting step of, when a predetermined number or more mask regions are included in the image capturing range in the image capturing step, joining a plurality of mask regions to be selected based on a closeness evaluation value which represents closeness of the mask regions and generating an enlarged mask region, and setting as a mask execution region the plurality of mask regions which includes the enlarged mask region in the image capturing range; and a mask processing step of performing mask processing on the mask execution region of the video image.

A non-transitory computer-readable recording medium which stores a mask processing program, wherein a mask processing program causes a camera device which has: an image capturing unit which captures an image of an object and generates a video image; and a mask region storage unit which stores a mask region, to function as: a mask execution region setting unit which, when a predetermined number or more mask regions are included in an image capturing range of the image capturing unit, joins a plurality of mask regions to be selected based on a closeness evaluation value which represents closeness of the mask regions and generates an enlarged mask region, and sets as a mask execution region the plurality of mask regions which includes the enlarged mask region in the image capturing range; and a mask processing unit which performs mask processing on the mask execution region of the video image.

According to the present technology, when there are a predetermined number or more mask regions in an image capturing range, it is possible to join a plurality of mask regions which is close to each other and generate an enlarged mask region.

The present technology includes other modes as described below. Accordingly, the disclosure of the present technology is intended to provide part of the present invention, and is not intended to limit the scope of the invention described and claimed herein.

DETAILED DESCRIPTION

Figure 1:
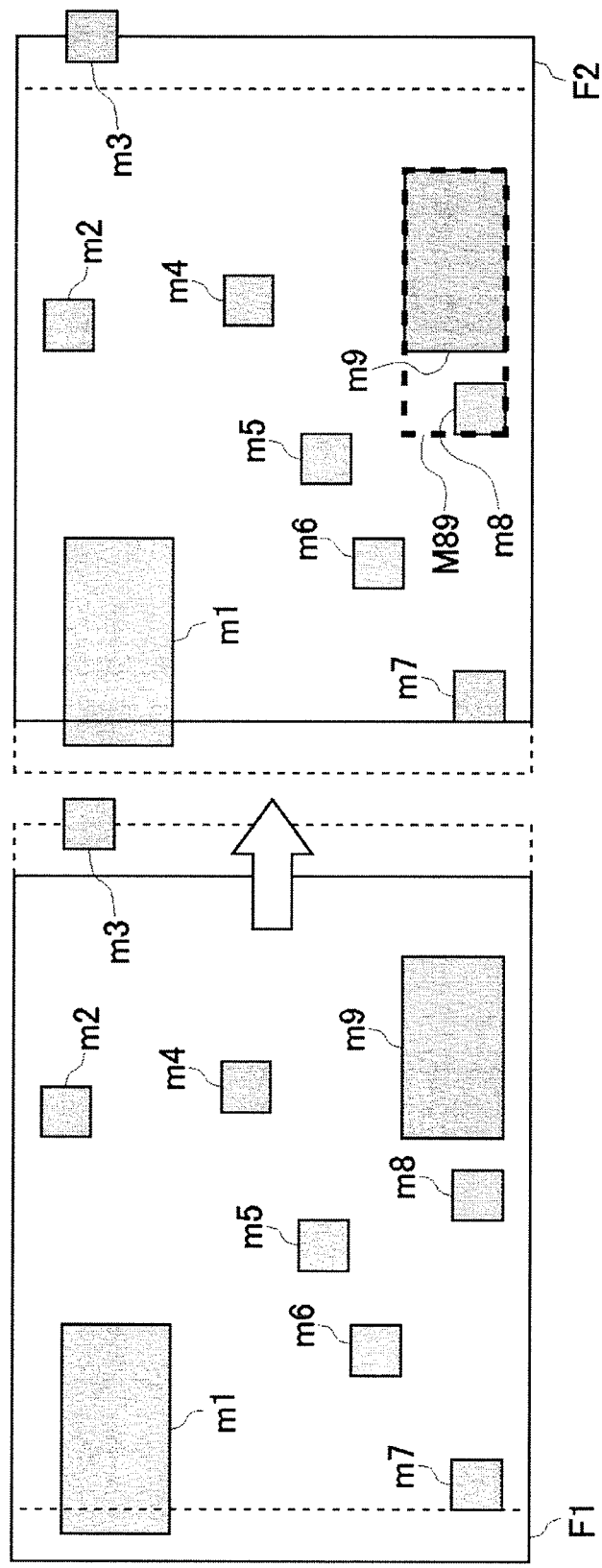
FIGS. 1A and 1B are views explaining a setting of mask execution regions according to a first embodiment of the present technology.

The present technology will be described in detail below. The embodiments described below are simple examples of the present technology, and the present technology can be modified to various modes. Accordingly, a specific configuration and function disclosed below by no means limit the claims.

A monitoring camera device according to an embodiment of the present technology employs a configuration including: an image capturing unit which captures an image of an object and generates a video image; a mask region storage unit which stores a mask region; a mask execution region setting unit which, when a predetermined number or more mask regions are included in an image capturing range, joins a plurality of mask regions to be selected based on a closeness evaluation value which represents closeness of the mask regions and generates an enlarged mask region, and sets as a mask execution region the plurality of mask regions which includes the enlarged mask region in the image capturing range; and a mask processing unit which performs mask processing on the mask execution region of the video image.

According to this configuration, when there are a predetermined number or more mask regions in the image capturing range of the image capturing unit, the mask region enlarged by joining a plurality of mask regions which is close to each other is generated.

In the monitoring camera device, the closeness evaluation value may be a distance between reference points of the plurality of mask regions.

According to this configuration, it is possible to easily evaluate closeness of the mask regions using the reference point of each mask region. The reference point may be, for example, the center of the mask region and may be an intersection point of diagonal lines when the mask region is rectangular.

In the monitoring camera device, the closeness evaluation value may be a distance between the closest portions of the plurality of mask regions.

According to this configuration, when space between the mask regions is small, these mask regions are joined.

In the monitoring camera device, the closeness evaluation value may be a difference between an area of the enlarged mask region and a sum of areas of the plurality of joined mask regions.

According to this configuration, it is possible to reduce a region which is masked even though the region does not need to be subjected to mask processing when the mask regions are joined, and prevent a decrease in a utility value of a video image.

The monitoring camera device may further have an image capturing range changing unit which changes the image capturing range of the image capturing unit, and the mask execution region setting unit may select the plurality of mask regions to be joined based also on a change of the image capturing range changed by the image capturing range changing unit.

According to this configuration, when not only closeness between the mask regions but also an image capturing range are changed, it is possible to select a plurality of mask regions to be joined based also on this change of the image capturing range.

In the monitoring camera device, the mask execution region setting unit may preferentially select a plurality of mask regions in a region opposite to a region which is newly included in the image capturing range as a result of the change of the image capturing range or in a region which is excluded from the image capturing range as a result of the change of the image capturing range.

According to this configuration, it is possible to join mask regions while hedging a region which a user (monitoring person) is likely to pay attention to following the change of the image capturing range. In addition, "a region which is newly included in the image capturing range as a result of the change of the image capturing range" corresponds to a region of a periphery of the image capturing range and the region opposite to this region is a center region of the image capturing range when, for example, the image capturing unit zooms out. Further, "a region which is excluded from the image capturing range as a result of the change of the image capturing range" corresponds to a region on a left side of the image capturing range when, for example, the monitoring camera pans in a right direction. Furthermore, when the monitoring camera zooms in, the region of the periphery of the image capturing range corresponds to "a region which is excluded from the image capturing range as a result of the change of the image capturing range".

In the monitoring camera device, the image capturing range changing unit may move the image capturing range in left and right directions, and the mask execution region setting unit may preferentially select a plurality of mask regions in a region which is excluded from the image capturing range as a result of the movement of the image capturing range in the left and right directions.

According to this configuration, it is possible to join mask regions while hedging a region which the user is likely to pay attention to following movement of the image capturing range in a horizontal direction by a panning operation of the image capturing unit.

In the monitoring camera device, the image capturing range changing unit may move the image capturing range in upper and lower directions, and the mask execution region setting unit may preferentially select a plurality of mask regions in a region which is excluded from the image capturing range as a result of the movement of the image capturing range in the upper and lower directions.

According to this configuration, it is possible to join the mask regions while hedging a region which the user is likely to pay attention to following movement of the image capturing range in a vertical direction by a tilting operation of the image capturing unit.

In the monitoring camera device, the image capturing range changing unit may be able to enlarge and reduce the image capturing range, and the mask execution region setting unit may preferentially select a plurality of mask regions in a region opposite to a region which is newly included in the image capturing range as a result of the enlargement of the image capturing range or in a region which is excluded from the image capturing range as a result of the reduction of the image capturing range.

According to this configuration, it is possible to join the mask regions while hedging a region which the user is likely to pay attention to following enlargement and reduction of the image capturing range by a zooming operation of the image capturing unit. In addition, enlargement of the image capturing range refers to enlarging an angle of view of the image capturing unit by a zoom-out operation and reduction of the image capturing range refers to reducing the angle of view of the image capturing unit by a zoom-in operation, and the enlargement and the reduction do not refer to enlargement and reduction of a subject image included in a video image.

In the monitoring camera device, the image capturing range changing unit may be able to move the image capturing range in an oblique direction by simultaneously moving the image capturing range in upper and lower directions and left and right directions, and, when the image capturing range is moved in the oblique direction, the mask execution region setting unit preferentially selects a plurality of mask regions in a region which is excluded from the image capturing range as a result of the movement in the left and right direction.

According to this configuration, it is possible to join the mask regions based on the change of the image capturing range prioritizing an operation in the panning direction in which a movable range is wide. In addition, "a region which is excluded from the image capturing range as a result of the movement in the left and right direction" is a region on a left side of the image capturing range when the image capturing range is moved in an upper right direction or a lower right direction, and is a region on a right side of the image capturing range when the image capturing range is moved in an upper left direction or a lower left direction.

In the monitoring camera device, the image capturing range changing unit may be able to move the image capturing range in an oblique direction by simultaneously moving the image capturing range in upper and lower directions and left and right directions, and when the image capturing range is moved in the oblique direction, the mask execution region setting unit may preferentially select a plurality of mask regions in a region which is excluded from the image capturing range as a result of the movement in the oblique direction.

According to this configuration, even when the image capturing range is moved in the oblique direction, it is possible to join the mask regions while hedging a region which the user is likely to pay attention to following the change of the image capturing range. In addition, "a region which is excluded from the image capturing range as a result of the movement in the oblique direction" is, for example, a lower left region of the image capturing range when the image capturing range is moved in the upper right direction and is an upper right region of the image capturing range when the image capturing range is moved in the lower left direction.

In the monitoring camera device, the mask execution region setting unit may select the plurality of mask regions in a region of a predetermined range which is on a side opposite to a side which is newly included in the image capturing range as a result of the change of the image capturing range or in a region of a predetermined range which is on a side which is excluded from the image capturing range as a result of the change of the image capturing range.

According to this configuration, it is possible to join the mask regions according to a priority based on the change of the image capturing range by limiting a region of the image capturing range in which the mask regions are joined.

In the monitoring camera device, the mask execution region setting unit may multiply the closeness value with a weight coefficient and select a plurality of mask regions of a minimum closeness evaluation value, wherein the weight coefficient becomes smaller toward a side which is opposite to a side which is newly included in the image capturing range as a result of the change of the image capturing range or a side which is excluded from the image capturing range as a result of the change of the image capturing range.

According to this configuration, it is possible to represent a priority for joining the mask regions based on the change of the image capturing range as a weight coefficient. In addition, that a weight coefficient which is multiplied with the distance between the mask regions which is used to determine mask regions to be joined is small means that the mask regions are likely to be joined, that is, the mask regions are preferentially joined. More specifically, when, for example, the image capturing range is moved in the right direction, the weight coefficient becomes smaller toward the left side and the mask regions are likely to be joined. Further, when, for example, the image capturing range is moved in the lower left direction, the weight coefficient becomes smaller toward the upper right side, and the mask regions are likely to be joined. Furthermore, in case of zoom-in, "a side which is excluded from the image capturing range as a result of the change of the image capturing range" is a periphery side of the image capturing range, and the weight becomes smaller while closer to a rim of the image capturing range and the mask regions are likely to be joined. In case of zoom-out, "a side which is newly included in the image capturing range as a result of the change of the image capturing range" is a periphery side of the image capturing range and the side opposite to this periphery side is a center side of the image capturing range, and a weight coefficient becomes smaller while closer to the center of the image capturing range and the mask regions are likely to be joined.

In the monitoring camera device, the mask processing unit may perform the mask processing such that the enlarged mask region is distinguished from the mask region which is not joined when the enlarged mask is displayed.

According to this configuration, the user can recognize a portion which becomes the mask region enlarged by joining the original mask regions.

A monitoring system according to an embodiment of the present technology employs a configuration including: an image capturing unit which captures an image of an object and generates a video image; a mask region storage unit which stores a mask region; a mask execution region setting unit which, when a predetermined number or more mask regions are included in an image capturing range of the image capturing unit, joins a plurality of mask regions to be selected based on a closeness evaluation value which represents closeness of the mask regions and generates an enlarged mask region, and sets as a mask execution region the plurality of mask regions which includes the enlarged mask region in the image capturing range; a mask processing unit which performs mask processing on the mask execution region of the video image; and a display monitor which displays the video image subjected to the mask processing.

According to this configuration, when there are a predetermined number or more mask regions in the image capturing range of the image capturing unit, it is possible to determine which mask regions to join based on a distance between the mask regions, and perform necessary monitoring while protecting privacy without masking the entire video image or failing to mask part of the mask regions.

A mask processing method according to an embodiment of the present technology includes: an image capturing step of capturing an image of an object and generating a video image; a mask region counting step of counting how many mask regions stored in advance are included in an image capturing range; a mask execution region setting step of, when a predetermined number or more mask regions are included in the image capturing range in the image capturing step, joining a plurality of mask regions to be selected based on a closeness evaluation value which represents closeness of the mask regions and generating an enlarged mask region, and setting as a mask execution region the plurality of mask regions which includes the enlarged mask region in the image capturing range; and a mask processing step of performing mask processing on the mask execution region of the video image.

This configuration also generates a mask region enlarged by joining a plurality of mask regions which is close to each other when there are a predetermined number or more mask regions in the image capturing range.

A non-transitory computer-readable recording medium which stores a mask processing program according to an embodiment of the present technology, wherein the mask processing program causes a camera device which has: an image capturing unit which captures an image of an object and generates a video image; and a mask region storage unit which stores a mask region, to function as: a mask execution region setting unit which, when a predetermined number or more mask regions are included in an image capturing range of the image capturing unit, joins a plurality of mask regions to be selected based on a closeness evaluation value which represents closeness of the mask regions and generates an enlarged mask region, and sets as a mask execution region the plurality of mask regions which includes the enlarged mask region in the image capturing range; and a mask processing unit which performs mask processing on the mask execution region of the video image.

This configuration also generates a mask region enlarged by joining a plurality of mask regions which is close to each other when there are a predetermined number or more mask regions in the image capturing range of the image capturing unit.

A monitoring camera device, a monitoring camera system, a monitoring method, and a monitoring program according to embodiments will be described below with reference to the drawings.

(First Embodiment)

Figure 2:
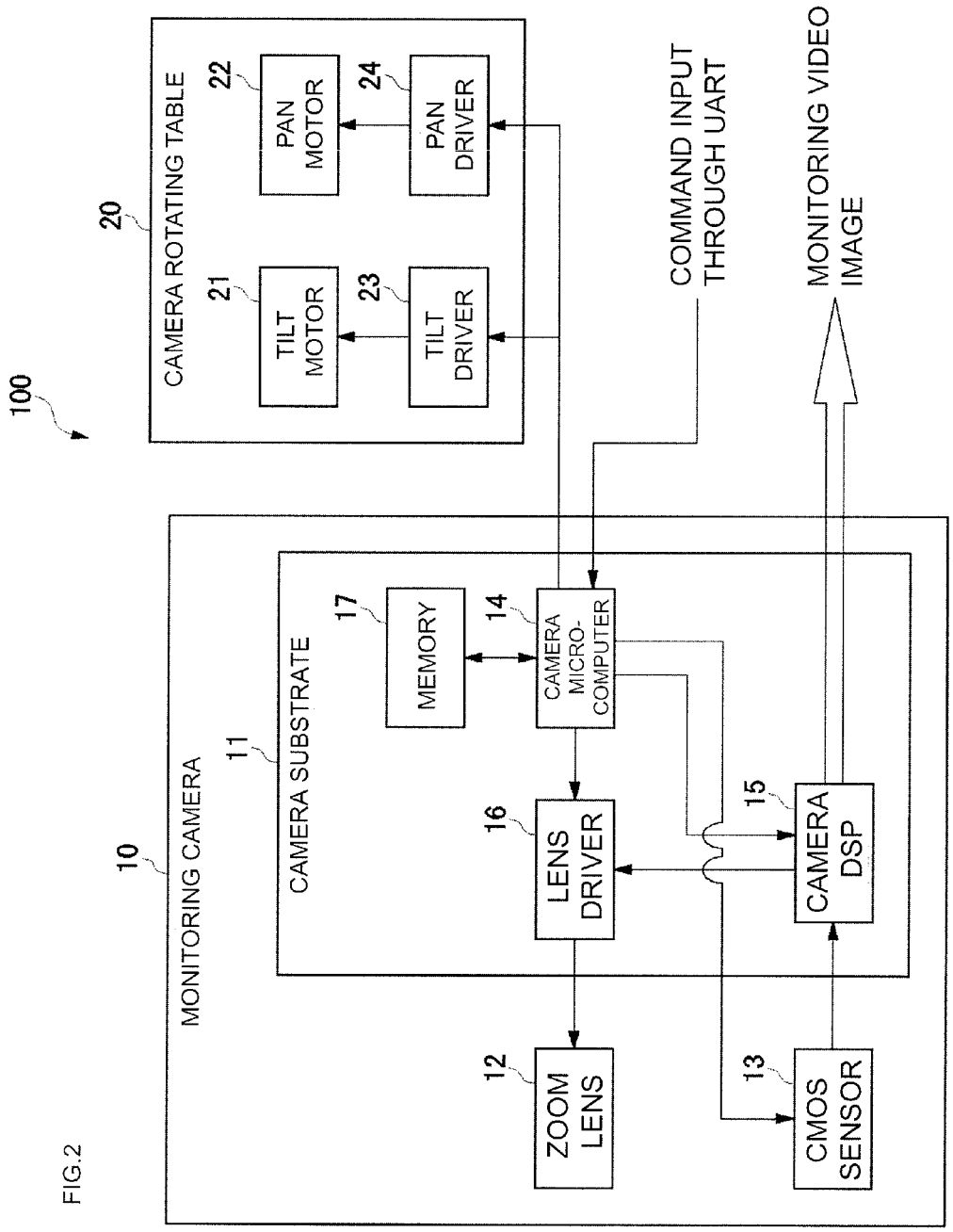
FIG. 2 is a block diagram illustrating a configuration of a monitoring camera device according to the first embodiment of the present technology.

FIG. 2 is a block diagram illustrating a configuration of a monitoring camera device according to a first embodiment. A monitoring camera device 100 has a monitoring camera 10 and a camera rotating table 20. The monitoring camera 10 is fixed to the camera rotating table 20, and is rotated in a pan direction and a tilt direction by the camera rotating table 20.

The monitoring camera 10 has a camera substrate 11, a zoom lens 12 and a CMOS sensor 13. The CMOS sensor 13 generates a video signal by converting an optical image which has passed through the zoom lens 12, into an electrical signal, and outputs the video signal as a monitoring video image. The zoom lens 12 is formed with a combination of a plurality of lenses, and can change a zoom magnifying power of an optical image by moving the lenses on an optical axis. Further, the zoom lens 12 adjusts focus. In addition, the configuration including the zoom lens 12 and the CMOS sensor 13 corresponds to an image capturing unit.

The camera substrate 11 has a camera microcomputer 14, a camera Digital Signal Processor (DSP) 15, a lens driver 16 and a memory 17. The camera microcomputer 14 performs various types of processing of the camera. The camera microcomputer 14 performs mask execution region setting processing in particular described below. Further, the camera microcomputer 14 receives a command input from an outside through a Universal Asynchronous Receiver Transmitter (UART), and outputs a zoom drive signal, a tilt drive signal and a pan drive signal to the lens driver 16, and the tilt driver 23 and the pan driver 24 described below.

Further, the camera microcomputer 14 may generate a drive signal irrespectively of a command input from an outside, and outputs the drive signal to a relevant driver in some cases. When, for example, the monitoring camera device 10 automatically repeats a panning operation and a tilting operation at a certain cycle, the pan drive signal and the tilt drive signal therefor are generated by the camera microcomputer 14 irrespectively of the command input and outputted to the relevant drivers.

The camera DSP 15 receives an input of a video signal as a monitoring video image from the CMOS sensor 13, and performs various types of image processing including compression processing on the video image signal. The camera DSP 15 performs mask processing on the inputted monitoring video image in particular. Further, the camera DSP 15 outputs a focus drive signal for adjusting the focus, to the lens driver 16 based on a frequency of the video signal. In addition, the video signal outputted from the CMOS sensor 13 is converted in to a digital signal by an A/D conversion circuit which is not illustrated, and is inputted to the camera DSP 15.

The monitoring video image subjected to image processing by the camera DSP 15 is transmitted to a computer equipped at a monitoring center which is not illustrated, or is recorded in a recording medium which is not illustrated. The computer of the monitoring center can perform communication with the monitoring camera device 100 through a communication network. Further, the monitoring camera device 100 has a display monitor, and the monitoring camera device 100 illustrated in FIG. 2 and this display monitor configure the monitoring system. In addition, a command input to the above camera microcomputer 14 from an outside may be given from the computer of this monitoring center.

The lens driver 16 drives the zoom lens 12 for adjusting zoom, based on the zoom drive signal from the camera microcomputer 14, and drives the zoom lens 12 for adjusting the focus based on the focus drive signal from the camera DSP 15.

The memory 17 stores various pieces of information used by the camera microcomputer 14. The memory 17 stores information of regions (mask regions) which need to be subjected to mask processing to protect privacy in an entire range whose image can be captured by the monitoring camera 10. As described above, the monitoring camera 10 can be rotated in the pan direction and the tilt direction by the camera rotating table 20, and an angle of view (view angle) can be changed by the zoom lens 12. A mask region is set to an entire range of which image can be captured in pan, tilt and zoom ranges, and is stored in the memory 17. The memory 17 corresponds to the mask region storage unit.

Each mask region is rectangular. The memory 17 stores position information of a center of a mask region (an intersection point of diagonal lines) and an upper left corner of the mask region as information for specifying each mask region. When obtaining a pan parameter value (pan angle), a tilt parameter value (tilt angle) and a zoom parameter value (zoom magnifying power), the camera microcomputer 14 specifies coordinate values of the center and the upper left corner of each mask region included in the image capturing range matching these parameter values. In addition, the memory 17 can store information of up to 32 mask regions.

The camera microcomputer 14 joins a plurality of mask regions where necessary, replaces these mask regions with one enlarged mask region, determines a region (mask execution region) of the image capturing range which is subjected to mask processing, and sets the region to the camera DSP 15. Thus, the camera microcomputer 14 which sets the mask execution regions corresponds to a mask execution region setting unit.

The camera DSP 15 performs mask processing on the mask execution region of the monitoring video image set by the camera microcomputer 14. The camera DSP 15 which performs mask processing in this way corresponds to the mask processing unit. In addition, the mask execution region setting unit is realized when the camera microcomputer 14 executes a mask processing program, and the mask processing unit is realized when the camera DSP 15 executes the mask processing program.

The camera rotating table 20 has a tilt motor 21, a pan motor 22, a tilt driver 23 and a pan driver 24. The tilt motor 21 is coupled to a tilt rotating mechanism and rotates the monitoring camera 10 in the tilt direction. The pan motor 22 is coupled to the pan rotating mechanism and rotates the monitoring camera 10 in the pan direction. In addition, movable ranges (angles) of the pan rotating mechanism and the tilt rotating mechanism may be arbitrary, and can be endlessly rotated.

The tilt driver 23 drives the tilt motor 21 according to the tilt drive signal from the camera microcomputer 14. The pan driver 24 drives the pan motor 22 according to the pan drive signal from the camera microcomputer 14. In addition, a command input from the UART may be directly given to the tilt driver 23 and the pan driver 24 as the tilt drive signal and the pan drive signal not to the camera microcomputer 14.

Next, how the camera microcomputer 14 sets a mask execution region will be described in detail. The camera DSP 15 according to the present embodiment can perform mask processing on only eight or less mask regions in a monitoring video image due to limitation of hardware resources of the camera DSP 15, and cannot perform mask processing on nine or more mask regions in a monitoring video image. Hence, when there are nine or more mask regions stored in the memory 17 in the image capturing range, the camera microcomputer 14 generates an enlarged mask region by joining part of these mask regions and reduces the number of mask execution regions to eight or less.

FIGS. 1A and 1B are views explaining a setting of mask execution regions set by the monitoring camera device according to the present embodiment. Solid line frames in FIGS. 1A and 1B indicate image capturing ranges, that is, outer rims of monitoring video images. In an example in FIGS. 1A and 1B, mask regions m1 to m9 are stored in the memory 17. In addition, although other mask regions are also stored in the memory 17, the mask regions m1 to m9 are stored as mask regions related to explanation of FIGS. 1A and 1B. Further, part of the mask regions may overlap each other.

In the example in FIGS. 1A and 1B, the monitoring camera 10 is rotated in the pan direction by the camera rotating table 20, and the image capturing range is moved in a right direction from FIG. 1A to FIG. 1B. In an image capturing range F1 in FIG. 1A, eight mask regions of the mask regions m1, m2 and m4 to m9 are included. The eight or less mask regions are included in the image capturing range F1, so that the camera DSP 15 can perform mask processing on all mask regions.

The camera microcomputer 14 counts the number of mask regions in the image capturing range and, when the number of mask regions is eight or less, sets these mask regions as mask execution regions to the camera DSP 15. In an example in FIG. 1A, the mask regions m1, m2 and m4 to m9 are set as mask execution regions to the camera DSP 15.

When the monitoring camera 10 is rotated in the right direction by the panning operation of the camera rotating table 20, the image capturing range is moved in the right direction as illustrated in FIG. 1B. In addition, a range indicated by a broken line in FIG. 1A indicates a range which becomes an image capturing range F2 after movement, and a range indicated by broken lines in FIGS. 1A and 1B indicate a range which is the image capturing range F1 before movement. After the image capturing range is moved, the mask region m3 is also included in the image capturing range F2 in addition to the mask regions m1, m2 and m4 to m9.

Then, the nine mask regions are included in the image capturing range F2, and therefore the camera DSP 15 cannot perform mask processing on all mask regions. Then, the camera microcomputer 14 selects two mask regions from these nine mask regions based on a closeness evaluation value which represents closeness of the mask regions, and generates a mask region enlarged by joining these two mask regions. These two joined mask regions are replaced with one enlarged mask region, and, by this means, the number of mask regions is reduced by one.

Although the closeness evaluation value which represents closeness of the mask regions can take various values, a distance between mask regions, that is, more specifically a distance between the closest portions of the two mask regions is taken as the closeness evaluation value in the present embodiment. In addition, the distance between the closest portions of the two mask regions refers to the closest distance among distances between arbitrary points of the two mask regions. In the present embodiment, each mask region is rectangular, and, when the two mask regions are arranged horizontally or vertically, a distance between neighboring sides of the two mask regions is a distance between the closest portions and, when the two mask regions are obliquely positioned, a distance between opposing angles is a distance between the closest portions. In addition, upon evaluation of the distance between the closest portions of the two mask regions, when part of the two mask regions overlap each other, the distance between these closest portions is evaluated as a negative value according to the degree of overlapping and a combination of the two mask regions of which distance is the closest are joined.

In the example in FIG. 1B, a distance between the closest portions of the mask region m8 and the mask region m9 is shorter than distances between the closest portions of the two mask regions of all other combinations. Hence, the camera microcomputer 14 generates an enlarged mask region M89 by joining the mask region m8 and the mask region m9. The enlarged mask region M89 completely includes the two mask regions m8 and m9, and has a rectangular shape of which area is the minimum.

That is, when an x coordinate is set in a horizontal direction of the image capturing range and a y coordinate is set in the vertical direction, the y coordinate on a top side of an enlarged mask region is the same as the y coordinate of a higher top side of the top sides of the two mask regions to be joined, the y coordinate on a bottom side of the enlarged mask region is the same as the y coordinate of a lower bottom side of the bottom sides of the two mask regions to be joined, the x coordinate on a left side of the enlarged mask region is the same as the x coordinate on a more leftward side of the left sides of the two mask regions and the x coordinate on a right side of the enlarged mask region is the same as the x coordinate on a more rightward side of the right sides of the two mask regions. The camera microcomputer 14 replaces information of the mask region m8 and the mask region m9 with information of this enlarged mask region M89 (information of coordinates of a center and an upper left corner).

The camera microcomputer 14 adds information which indicates that the enlarged mask region M89 is an enlarged mask region to the information of the enlarged mask region M89. The camera microcomputer 14 repeats joining the mask regions as described above until the number of mask regions in the image capturing range is eight or less, and, when the number of mask regions in the image capturing range is eight or less, sets to the camera DSP 15 a plurality of (eight or less) mask regions including the enlarged mask region as mask execution regions. In this case, information which indicates this setting is added to the enlarged mask region.

Although the camera DSP 15 performs mask processing on the mask execution regions set by the camera microcomputer 14, the camera DSP 15 performs mask processing such that the enlarged mask region is distinguished from normal mask regions which are not joined when the enlarged mask is displayed. More specifically, a frame and/or a color are applied only to the enlarged mask region, or a different frame and/or color from mask regions which are not joined are applied to the enlarged mask region. Further, a color may be changed per joined and enlarged mask region, and a depth of a color may be set to change according to the number of mask regions to be joined (for example, the color becomes deeper when the number increases).

Figure 3:
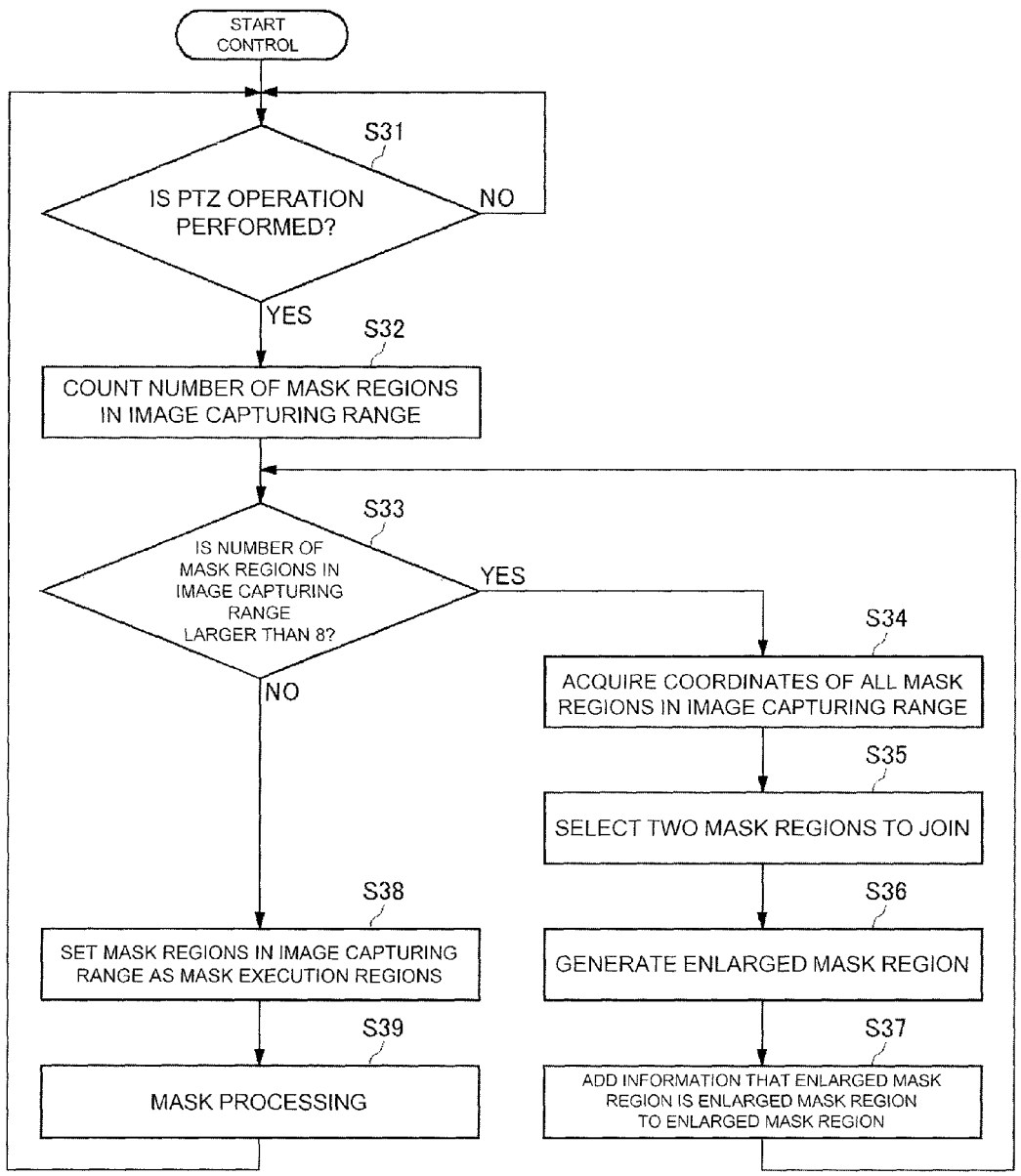
FIG. 3 is a flowchart of mask execution region setting processing and mask processing according to the first embodiment of the present technology.

FIG. 3 is a flowchart of mask execution region setting processing and mask processing performed by the camera microcomputer 14 and the camera DSP 15. The camera microcomputer 14 monitors whether or not a PTZ operation is performed (step S31). The camera microcomputer 14 determines that the PTZ operation is performed when a command of the PTZ operation is inputted from an outside and when the PTZ operation is automatically performed, that is, when a drive signal is outputted to at least one of the lens driver 16, the tilt driver 23 and the pan driver 24.

As long as the PTZ operation is not performed (NO in step S31), the number of mask regions included in the image capturing range does not fluctuate, and therefore the camera microcomputer 14 does not newly set a mask execution region and the camera DSP 15 continues executing mask processing on the mask execution regions which have been set.

When the PTZ operation is performed (YES in step S31), the camera microcomputer 14 counts the number of masks in the image capturing regions (step S32). In addition, when the camera device 10 is launched, step S31 is skipped and step S32 is executed. The camera microcomputer 14 specifies the image capturing range based on pan, tilt and zoom parameter values, and counts how many mask regions stored in the memory 17 are included in this image capturing region. In this case, mask regions only part of which are included in the image capturing range are also counted.

The camera microcomputer 14 determines whether or not the number of mask regions in the image capturing regions exceeds eight which is the maximum number of mask processing which can be executed by the camera DSP 15 (step S33). When the number of mask regions in the image capturing region is larger than eight, the camera microcomputer 14 acquires coordinates of centers and coordinates of upper left corner of all mask regions in the image capturing range (step S34) and selects a combination of mask regions to be joined based on these coordinates (step S35).

The camera microcomputer 14 selects as a combination of mask regions to be joined the two mask regions of which distance between the closest portions is the closest. The camera microcomputer 14 joins the two selected mask regions, and generates an enlarged mask region including both of these mask regions (step S36). The camera microcomputer 14 replaces information of the two mask regions to be joined, with information of one enlarged mask region (information of the coordinates of the center and the upper left corner).

Next, the camera microcomputer 14 adds information which indicates that the enlarged mask region is an enlarged mask region, to the enlarged mask region (step S37). Further, back to step S33, whether or not the number of mask regions in the image capturing range exceeds eight is determined. In this case, the two joined mask region are counted as one mask region.

When the number of mask regions in the image capturing range exceeds eight (YES in step S33), step S34 to step S37 are repeated until the number of mask regions is eight or less. In this case, the enlarged mask region is also equally handled as a normal mask region to evaluate a distance between the mask regions. Hence, another mask region is further joined to the enlarged mask region to generate a newly enlarged mask region in some cases.

When the number of mask regions in the image capturing range is eight or less as a result of joining mask regions and when there are originally only eight or less mask regions stored in the memory 17 in the image capturing range, determination in step S33 is NO and the camera microcomputer 14 sets to the camera DSP 15 a mask region in the image capturing range in this case as a mask execution region (step S38).

The camera DSP 15 performs mask processing on the mask execution regions set by the camera microcomputer 14 (step S39), and returns to step S31 and monitors whether or not the PTZ operation is performed. In addition, as described above, the camera DSP 15 performs mask processing by applying a frame or a color to the enlarged mask region such that the enlarged mask region is distinguished from mask regions which are not joined.

In addition, although a case has been described above assuming that the number of mask regions increases or decreases when an image capturing range is changed by the PTZ operation of the monitoring camera 10, the above monitoring camera device is effectively applied even when the image capturing range is not changed by the PTZ operation and when a moving person is tracked and masked. This is because, in this case, the number of mask regions increases when a person enters the image capturing range and the number of mask regions decreases when the person goes out of the image capturing range. Further, in this case, a relative positional relationship between a plurality of mask regions changes according to a motion of the person, and, then, the mask regions to be joined also dynamically change.

(Second Embodiment)

A configuration of a monitoring camera device according to a second embodiment is the same as a configuration of a monitoring camera device according to the first embodiment illustrated in FIGS. 1A and 1B. The present embodiment differs from the first embodiment in mask execution region setting processing performed by a camera microcomputer 14. In the present embodiment, the camera microcomputer 14 selects two mask regions to be joined based not only on a distance between the closest portions of the two mask regions but also on a change of an image capturing range upon setting of mask execution regions. This will be described more specifically.

As described in the first embodiment, a monitoring camera 10 has a zoom lens 12 and is fixed to a camera rotating table 20 which rotates in a tilt direction and a pan direction, and then an image capturing range is enlarged and reduced and is vertically and horizontally moved by a PTZ direction. In a monitoring image, there is a region which is newly included in an image capturing range as a result of a change of the image capturing range and a region which is excluded from the image capturing range as a result of the change of the image capturing range.

For example, when the monitoring camera 10 is rotated in a right direction by the panning operation, the image capturing range is moved in the right direction. In this case, a region on a right side of a monitoring video image is a region which is newly included in the image capturing range as a result of rightward movement of the image capturing range, and a region on a left side of the monitoring video image is a region which is excluded from the image capturing range as a result of rightward movement of the image capturing range. When a user watches the monitoring video image of which image capturing range is moving, the region which is newly included in the image capturing range is focused upon. Hence, in the region to be focused upon, mask regions are desirably joined to avoid a state where regions which do not originally need to be masked are subjected to mask processing.

Hence, the camera microcomputer 14 according to the present embodiment preferentially selects a combination of mask regions in a region opposite to the region which is newly included in the image capturing range as a result of the change of the image capturing range and a region which is excluded from the image capturing range as a result of the change of the image capturing range.

"The region which is newly included in the image capturing range as a result of the change of the image capturing range" corresponds to a region of a periphery of the image capturing range and the opposite region to this region is a region in the center of the image capturing range when, for example, the zoom lens 12 zooms out. Further, "a region which is excluded from the image capturing range as a result of the change of the image capturing range" corresponds to a region on a lower side of the image capturing range when the monitoring camera 10 is tiled in an upper direction and the image capturing range is moved in the upper direction. Furthermore, when the zoom lens 12 zooms in, the region of the periphery of the image capturing range corresponds to "a region which is excluded from the image capturing range as a result of the change of the image capturing range".

When the PTZ operation is performed, the camera microcomputer 14 preferentially selects these regions as two mask regions to be joined. More specifically, the camera microcomputer 14 selects two mask regions to be joined, in a region of a predetermined range on a side opposite to a side which is newly included in an image capturing range as a result of a change of the image capturing range or in a region of a predetermined range on a side which is excluded from the image capturing range as a result of the change of the image capturing range. In the present embodiment, the predetermined range is a range which is one third of the entire image capturing range.

The camera microcomputer 14 selects two mask regions of which closeness evaluation value is the smallest in a rectangular region which is one third on the left side of the image capturing range when, for example, the image capturing range is moved in the right direction. Similarly, when the image capturing range is moved in the left direction, the upper direction or the lower direction, two mask regions of which closeness evaluation value is the smallest are selected in a rectangular region which is one third on the right side, one third on the bottom side and one third on the top side of the image capturing range. Further, the camera microcomputer 14 selects the two mask regions of which closeness evaluation value is the smallest in a rectangular region of which size is one third of the image capturing range in the center of the image capturing range when the image capturing range is enlarged by the zoom-out operation, and selects two mask regions of which closeness evaluation value is the smallest in a frame-shaped region from which the rectangular region of which size is two thirds of the image capturing range in the center of the image capturing range is excluded when the image capturing range is reduced by the zoom-in operation.

In addition, the camera microcomputer 14 selects a combination of mask regions of which closeness evaluation value is small in the entire image capturing range similar to the first embodiment when there are not two mask regions in the region of this predetermined range, and joins the mask regions.

Figure 4:
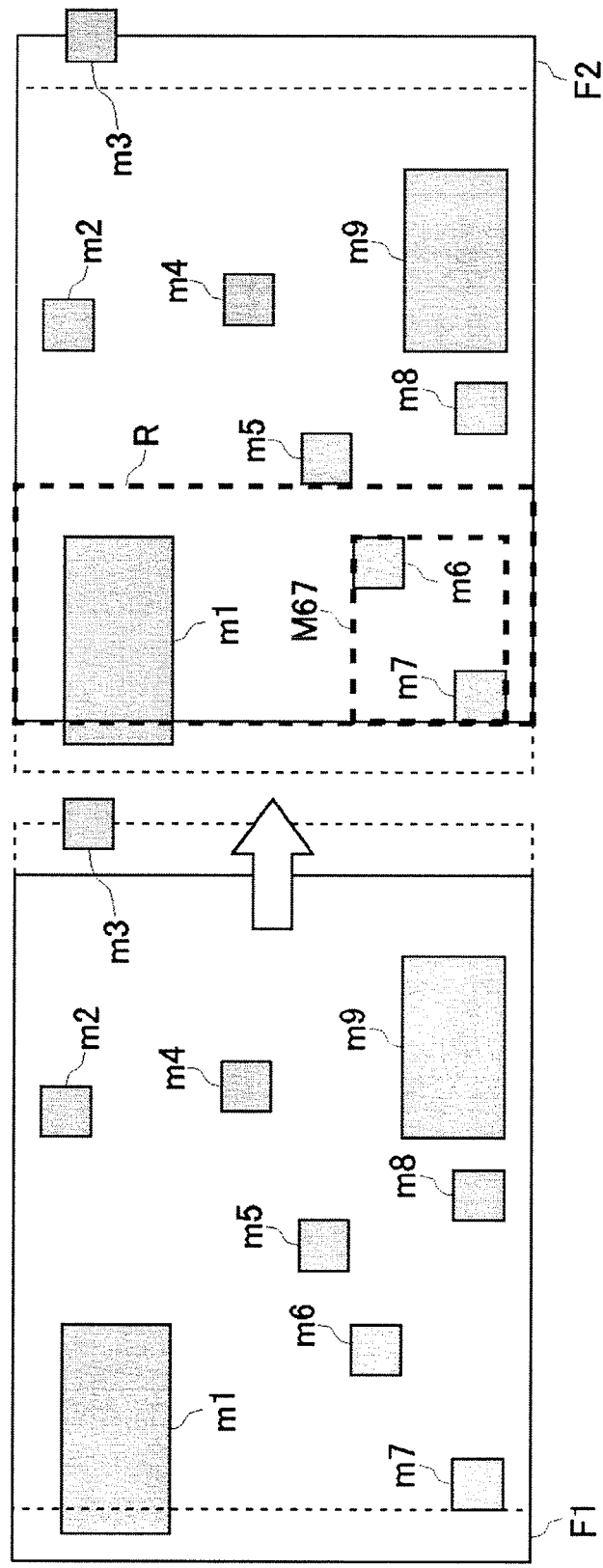
FIGS. 4A and 4B are views explaining a setting of mask execution regions according to a second embodiment of the present technology.

FIGS. 4A and 4B are views explaining a setting of mask execution regions set by the monitoring camera device according to the present embodiment. Solid line frames in FIGS. 4A and B indicate image capturing ranges, that is, outer rims of a monitoring video image. Also in an example of FIGS. 4A and 4B, mask regions m1 to m9 are stored similar to the example in FIGS. 1A and 1B. The monitoring camera 10 is rotated in the pan direction by the camera rotating table 20, and the image capturing range is moved in the right direction from FIG. 1A to FIG. 1B.

In an image capturing range F1 in FIG. 4A, eight mask regions of the mask regions m1, m2 and m4 to m9 are included. When the monitoring camera 10 is rotated in the right direction by the panning operation of the camera rotating table 20, the image capturing range is moved in the right direction as illustrated in FIG. 4B. After the image capturing range is moved, the mask region m3 is also included in the image capturing range F2 in addition to the mask regions m1, m2 and m4 to m9. Then, the nine mask regions are included in the image capturing range F2, and therefore the camera microcomputer 14 generates a mask region enlarged by joining two mask regions of these mask regions.

In this case, the camera microcomputer 14 selects a combination of mask regions of which closeness evaluation value is the smallest in a rectangular region R which is one third on the left side of the image capturing range F2. In an example in FIG. 4B, the mask regions m1, m6 and m7 are included in the region R and the distance between the closest portions of a combination of the mask regions m6 and m7 among these regions is the closest, so that these mask regions are selected and an enlarged mask region M67 is generated. The camera microcomputer 14 replaces information of the mask region m6 and the mask region m7 with information of the enlarged mask region M67.

In addition, the camera microcomputer 14 can also move an image capturing range in an oblique direction by simultaneously outputting a tilt drive signal and a pan drive signal to the tilt driver 23 and the pan driver 24 and simultaneously driving the tilt motor 21 and the pan motor 22. In this case, the region R for selecting mask regions to be joined is set by focusing only on movement of the image capturing range moved in the left and right directions by the panning operation and selecting two mask regions from a region of a predetermined range which is excluded from the image capturing range as a result of movement in the left and right directions.

The image capturing range is preferentially moved in the left and right directions by the panning operation because a movable range of the image capturing range in the left and right directions by panning operation is wider than a movable range of the image capturing range in the upper and lower directions by the tilting operation. In addition, when the zooming operation is simultaneously performed in addition to the panning operation, the region R for selecting mask regions to be joined is set by preferentially moving the image capturing range in the left and right directions by the panning operation instead of enlarging or reducing the image capturing range by the zooming operation.

Figure 5:
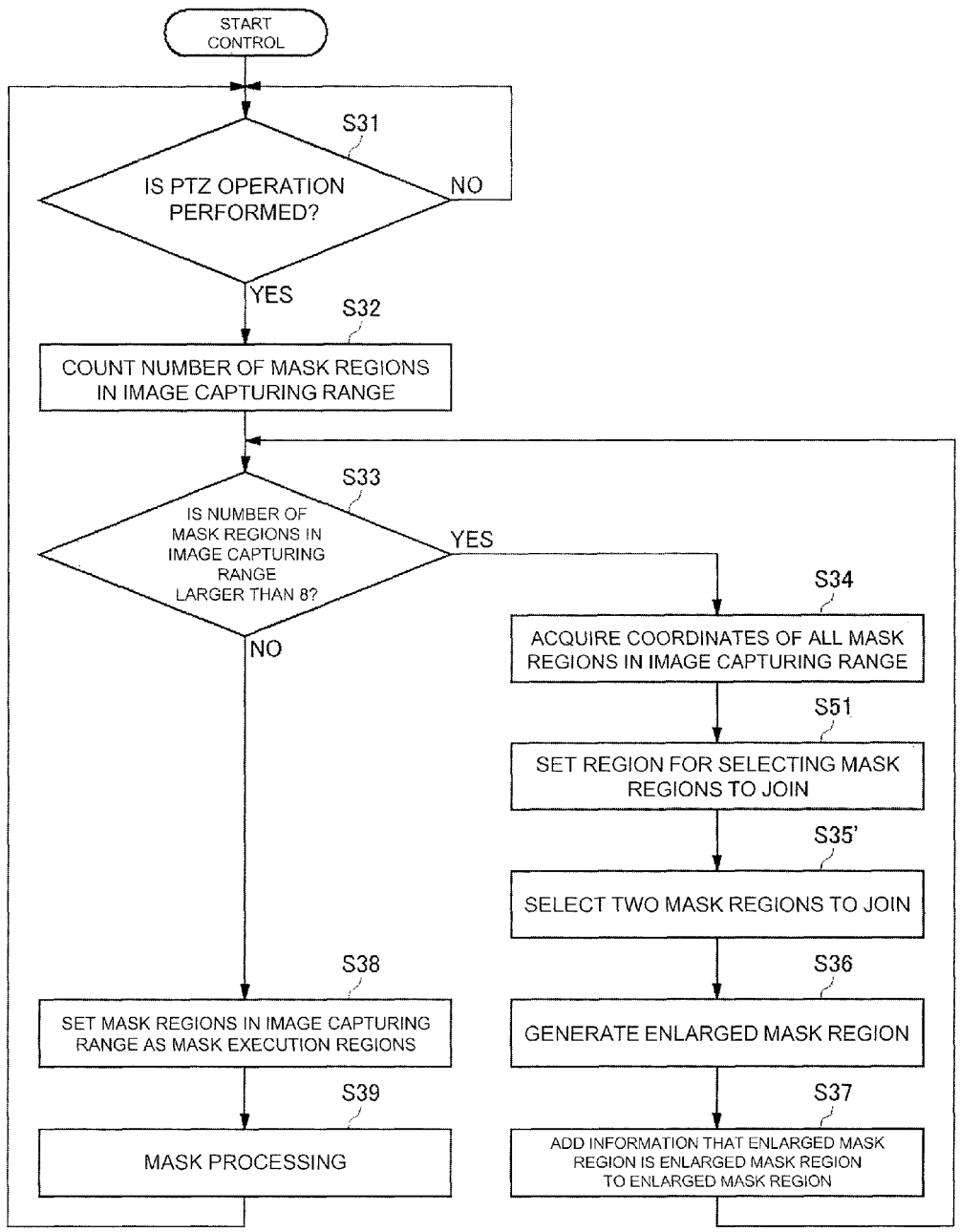
FIG. 5 is a flowchart of mask execution region setting processing and mask processing according to the second embodiment of the present technology.

FIG. 5 is a flowchart of mask execution region setting processing and mask processing according to the second embodiment. In FIG. 5, the same processing as mask execution region setting processing and mask processing according to the first embodiment illustrated in FIG. 3 will be assigned the same reference numerals. In the present embodiment, when two mask regions are selected and joined, after coordinates of mask regions in the image capturing range are acquired (step S35), the region R for selecting the mask region to be joined is set (step S51). Further, in step (step S35') of selecting the next two mask regions to be joined, the two mask regions to be joined are selected from the region R set in step S51 similar to the first embodiment.

As described above, according to the present embodiment, it is possible to join mask regions while hedging a region which a user is likely to pay attention to following a change of the image capturing range and, consequently, prevent a decrease in a utility value of a monitoring video image.

(Modified Example)

Although two mask regions to be joined are selected from a region of a predetermined range which a user is likely to pay attention, based on a change of an image capturing range in the second embodiment, a priority of joining of mask regions may be set stepwise by setting to the image capturing range a weight coefficient matching a change of the image capturing range. In this case, a weight coefficient is made smaller on a side which is closer to a side opposite to a side which is newly included in the image capturing range as a result of a change of an image capturing range or which is closer to a side which is excluded from the image capturing range as a result of the change of the image capturing range, this weight coefficient is multiplied on a closeness evaluation value, and two mask regions of a minimum closeness evaluation value is selected by the camera microcomputer 14 as mask regions.

In addition, that a weight coefficient is small means that mask regions are likely to be joined, that is, mask regions are preferentially joined. When, for example, the image capturing range is moved in the right direction, the weight coefficient is smaller on a more leftward side in the image capturing range, and the mask regions are likely to be joined. Further, it is also possible to understand that, in the second embodiment, a weight coefficient of the region R for selecting mask regions to be joined is 1 and weight coefficients of regions other than the region R are 0.

Furthermore, although, in the second embodiment, when the panning operation is performed simultaneously with the tilting operation and/or the zooming operation, a region for selecting mask regions to be joined is set by prioritizing the panning operation, the present invention is not limited to this. When the image capturing range is moved in the oblique direction, the camera microcomputer 14 may preferentially select a plurality of mask regions which is in a region which is excluded from the image capturing range as a result of movement in the oblique direction. The "region which is excluded from the image capturing range as a result of movement in the oblique direction" is a rectangular region which is set in the lower left of the image capturing range when the image capturing range is moved in an upper right direction, and size of the rectangular region is one third of the entire image capturing range. In the modified example above, this region may also be set.

Further, the size of the region for selecting mask regions to be joined, which is described in the above first and second embodiments and the above modified example, may be changed according to a speed of a change (movement or enlargement/reduction) of the image capturing range. In this case, the camera microcomputer 14 may set a small region for selecting mask regions to be joined when the speed is faster.

Further, although, in the first and second embodiments, there are a predetermined number or more mask regions in the image capturing range and a distance between the closest portions of the two mask regions is used as a closeness evaluation value to select two mask regions of which distance is the closest as mask regions to be joined, the closeness evaluation value for selecting the two mask regions to be joined is not limited to this. The closeness evaluation value may be a distance between reference points of two mask regions. In this case, the reference point may be, for example, a center of each mask region (an intersection point of diagonal lines when a mask region is rectangular).

Further, a closeness evaluation value may be an area of a region other than two original mask regions in a mask region enlarged by joining two mask regions, that is, a difference between an area of the enlarged mask region and a sum of areas of a plurality of joined mask regions. This area difference is an area of a region which is subjected to mask processing when mask regions are joined even though these mask regions are not originally mask regions and, by selecting and joining two mask regions which make such an area small, it is possible to reduce a region which is masked even though the region does not need to be masked when mask regions are joined and prevent a decrease in a utility value of a monitoring video image. Further, this area difference can be easily calculated by subtracting the area of the two mask regions from the area of the enlarged mask region.

Further, a closeness evaluation value may be calculated by integrally taking into account an arbitrary combination of a distance between the closest portions of two mask regions, a distance between reference points of the two mask regions and an area difference between an enlarged mask region and the two original mask regions.

Further, although, in the first and second embodiments, the camera microcomputer 14 reduces by one the number of mask regions by joining two mask region and generating one enlarged mask region and repeats this processing until the number of mask regions in the image capturing range becomes a predetermined number or less, the camera microcomputer 14 may select three or more mask regions in the image capturing range, join the mask regions and generate an enlarged mask region.

In this case, when the closeness evaluation value is a distance between the closest portions or a distance between reference points, the closeness evaluation value may be a sum of distances between two mask regions among three mask regions, and, when the closeness evaluation value is an area of a region which is unnecessarily masked by the enlarged mask region, the closeness evaluation value may be an area of a region which is unnecessarily masked due to the smallest enlarged mask region which includes all of three mask regions.

Further, although, in the first embodiment and the second embodiment, the camera DSP 15 performs mask processing using hardware and the number of mask regions which can be subjected to mask region is limited, the present technology is also useful even when the camera DSP 15 performs mask processing using software. Even when mask processing is performed using software, a processing load is reduced by reducing the number of mask regions.

Further, although examples have been described with the first and second embodiments where a monitoring camera device 100 performs both of mask execution region setting processing and mask processing, one or both of the processing may be executed by a computer which configures a monitoring system together with the monitoring camera device 100 or another computer which can communicate with the monitoring camera device 100, and this computer, the monitoring camera device 100 and a display monitor of a monitoring center may configure the monitoring system.

Furthermore, although, in the first and second embodiments, the monitoring camera 10 is installed on the camera rotating table 20 and performs a panning operation and a tilting operation, the monitoring camera 10 may be a portable camera which is not installed on the camera rotating table 20. For example, this monitoring camera 10 may be realized when a smartphone which has a camera function executes a mask processing program. In this case, process of monitoring a PTZ operation in the first and second embodiments (step S31 in FIGS. 3 and 5) is unnecessary. Further, the image capturing range of the monitoring camera 10 is moved when the user moves the monitoring camera 10, in step S51 in FIG. 5, a moving direction of the monitoring camera 10 may be found by image processing performed on a monitoring video image or by an acceleration sensor which the monitoring camera 10 has.

Furthermore, although, in the first and second embodiments, mask regions stored in advance in the memory 17 are rectangular and an enlarged mask region generated by joining the mask region is also rectangular, shapes of mask regions are not limited to rectangular shape. For example, mask regions stored in advance may have circular shapes, elliptical shapes or arbitrary shapes. In this case, an enlarged mask region may be a shape such as a rectangular shape, a circular shape or an elliptical shape including the mask regions of these shapes.

Although the preferred embodiments of the present invention which can be thought of at the moment have been described above, the present embodiment can be variously modified and those modifications within the true spirit and scope of the present invention are intended to be included in the attached claims.

The present invention is useful as, for example, a monitoring camera device which, when there are a predetermined number or more mask regions in an image capturing range, can join a plurality of mask regions which is close to each other and generate an enlarged mask region, and mask part of video images to protect privacy.

CROSS-REFERENCE TO RELATED APPLICATION

This application claims priority to Japanese Patent Application No. 2012-260799 filed on Nov. 29, 2012, the entire contents of which are incorporated by reference herein.

What is claimed is:

1. A monitoring camera device comprising:
an image capturer which captures an image of an object and generates a video image;
a mask region storage which stores a mask region;
a mask execution region setter which sets, as a mask execution region, a plurality of mask regions included in an image capturing range and defines a partial region to include at least two mask regions in the image capturing range, at least one mask region, set by the mask execution region setter, being outside of the partial region;
a mask processor which performs mask processing on the mask execution region of the image capturer; and
an image capturing range changer which changes the image capturing range of the image capturer; wherein
the mask execution region setter changes a position of the partial region to include at least two mask regions based on a change of the image capturing region by the image capturing range changer, and selects, from the mask regions in the partial region, at least two mask regions positioned in the changed partial region from among the plurality of mask regions, based upon a predetermined criterion and the mask execution region setter generates an enlarged mask, smaller than the partial region, including the selected at least two mask regions and at least a portion of the partial region outside of the selected at least two mask regions, and sets the generated enlarged mask as the mask execution region;

wherein the mask execution region setter defines a closeness evaluation value by multiplying a closeness value, representing a closeness of mask regions, with a weight coefficient and selects the at least two mask regions having a minimum closeness evaluation value, wherein the weight coefficient becomes smaller toward a side which is opposite to a side which is newly included in the image capturing range as a result of the change of the image capturing range or toward a side which is excluded from the image capturing range as a result of the change of the image capturing range.

2. The monitoring camera device according to claim 1, wherein the closeness evaluation value is a distance between reference points of the at least two mask regions of the plurality of mask regions.

3. The monitoring camera device according to claim 1, wherein the closeness evaluation value is a distance between the closest portions of the at least two mask regions of the plurality of mask regions.

4. The monitoring camera device according to claim 1, wherein the closeness evaluation value is a difference between an area of the enlarged mask region and a sum of areas of the plurality of selected mask regions.

5. The monitoring camera device according to claim 1, wherein the mask execution region setter preferentially selects the at least two mask regions in the partial region which is opposite to a region newly included in the image capturing range as a result of the change of the image capturing range or in the partial region which is excluded from the image capturing range as a result of the change of the image capturing range.

6. The monitoring camera device according to claim 1, wherein the image capturing range changer moves the image capturing range in left and right directions, and the mask execution region setter preferentially selects the at least two mask regions in the partial region which is excluded from the image capturing range as a result of the movement of the image capturing range in the left and right directions.

7. The monitoring camera device according to claim 1, wherein the image capturing range changer moves the image capturing range in upper and lower directions, and the mask execution region setter preferentially selects at least two mask regions in the partial region which is excluded from the image capturing range as a result of the movement of the image capturing range in the upper and lower directions.

8. The monitoring camera device according to claim 1, wherein the image capturing range changer can enlarge and reduce the image capturing range, and the mask execution region setter preferentially selects the at least two mask regions in the partial region which is opposite to a region newly included in the image capturing range as a result of the enlargement of the image capturing range or in the partial region which is excluded from the image capturing range as a result of the reduction of the image capturing range.

9. The monitoring camera device according to claim 1, wherein the image capturing range changer can move the image capturing range in an oblique direction by simultaneously moving the image capturing range in upper and lower directions and left and right directions, and when the image capturing range is moved in the oblique direction, the mask execution region setter preferentially selects the at least two mask regions in the partial region which is excluded from the image capturing range as a result of the movement in the left and right direction.

10. The monitoring camera device according to claim 1, wherein the image capturing range changer can move the image capturing range in an oblique direction by simultaneously moving the image capturing range in upper and lower directions and left and right directions, and when the image capturing range is moved in the oblique direction, the mask execution region setter preferentially selects the at least two mask regions in the partial region which is excluded from the image capturing range as a result of the movement in the oblique direction.

11. The monitoring camera device according to claim 1, wherein the mask execution region setter selects the at least two mask regions in a region of a predetermined range which is on a side opposite to a side which is newly included in the image capturing range as a result of the change of the image capturing range or in a region of a predetermined range which is on a side which is excluded from the image capturing range as a result of the change of the image capturing range.

12. The monitoring camera device according to claim 1, wherein the mask processor performs the mask processing such that the enlarged mask region is distinguished from a mask region which is not selected when the enlarged mask is displayed.

13. A monitoring system comprising:

an image capturer which captures an image of an object and generates a video image;

an image capturing range changer which changes an image capturing range of the image capturer in accordance with an user input;

a mask region storage which stores a mask region;

a mask execution region setter which sets, as a mask execution region, a plurality of mask regions included in an image capturing range and defines a partial region to include at least two mask regions in the image capturing range, at least one mask region, set by the mask execution region setter, being outside of the partial region;

a mask processor which performs mask processing on the mask execution region of the image capturer; and a display monitor which displays the video image subjected to the mask processing, wherein the mask execution region setter changes a position of the partial region to include at least two mask regions based on a change of the image capturing region by the image capturing range changer, and selects, from the mask regions in the partial region, at least two mask regions positioned in the changed partial region from among the plurality of mask regions, based upon a predetermined criterion; and the mask execution region setter generates an enlarged mask, smaller than the partial region, including the selected at least two mask regions and at least a portion of the partial region outside of the selected at least two mask regions, and sets the generated enlarged mask as the mask execution region;

wherein the mask execution region setter defines a closeness evaluation value by multiplying a closeness value, representing a closeness of mask regions, with a weight coefficient and selects the at least two mask regions having a minimum closeness evaluation value, wherein the weight coefficient becomes smaller toward a side which is opposite to a side which is newly included in the image capturing range as a result of the change of the image capturing range or toward a side which is excluded from the image capturing range as a result of the change of the image capturing range.

14. A mask processing method comprising:

capturing an image of an object within an image capturing range and generating a video image;

changing an image capturing range in accordance with an user input;

setting a partial region within the image capturing range, a position of the partial region being changed to include at least two mask regions in the image capturing range based on the user input changing the image capturing range, at least one mask region being outside of the partial region;

selecting, based upon a predetermined criterion, at least two mask regions from among a plurality of mask regions positioned in the changed image capturing range, the selected at least two mask regions being included in the set partial region;

generating an enlarged mask, smaller than the partial region, including the selected at least two mask regions and at least a portion of the partial region outside of the selected at least two mask regions;

setting the enlarged mask as a mask execution region; and performing mask processing on the mask execution region of the video image;

wherein the setting a partial region comprises defining a closeness evaluation value by multiplying a closeness value, representing a closeness of mask regions, with a weight coefficient and selecting the at least two mask regions having a minimum closeness evaluation value, wherein the weight coefficient becomes smaller toward a side which is opposite to a side which is newly included in the image capturing range as a result of the change of the image capturing range or toward a side which is excluded from the image capturing range as a result of the change of the image capturing range.

15. A non-transitory computer-readable recording medium in which a mask processing program is stored, wherein the mask processing program causes a camera device which comprises an image capturer which captures an image of an object and generates a video image and a mask region storage which stores a mask region, to function as:

a mask execution region setter which sets, as a mask execution region, a plurality of mask regions included in an image capturing range and defines a partial region to include at least two mask regions in the image capturing range, at least one mask region, set by the mask execution region setter, being outside of the partial region;

a mask processor which performs mask processing on the mask execution region of the video image and;

an image capturing range changer which changes the image capturing range of the image capturer; wherein the mask execution region setter changes a position of the partial region to include at least two mask regions based on a change of the image capturing region by the image capturing range changer, and selects, from the mask regions in the partial region, at least two mask regions positioned in the changed partial region from among the plurality of mask regions, based upon a predetermined criterion;

the mask execution region setter generates an enlarged mask, smaller than the partial region, including the selected at least two mask regions and at least a portion of the partial region outside of the selected at least two mask regions, and sets the generated enlarged mask as the mask execution region; and the mask execution region setter defines a closeness evaluation value by multiplying a closeness value, representing a closeness of mask regions, with a weight coefficient and selects the at least two mask regions having a minimum closeness evaluation value, wherein the weight coefficient becomes smaller toward a side which is opposite to a side which is newly included in the image capturing range as a result of the change of the image capturing range or toward a side which is excluded from the image capturing range as a result of the change of the image capturing range.

* * * * *